United States Patent [19]

Graham

[11] Patent Number: 4,513,985

[45] Date of Patent: Apr. 30, 1985

[54] BICYCLE FRAME SEAT STAYS

[75] Inventor: David R. Graham, West Redding, Conn.

[73] Assignee: Cannondale Corporation, Georgetown, Conn.

[21] Appl. No.: 456,302

[22] Filed: Jan. 6, 1983

[51] Int. Cl.³ .............................................. B62K 19/02
[52] U.S. Cl. ................................................ 280/281 R
[58] Field of Search ..................... 280/281 R, 283, 288

[56] References Cited

U.S. PATENT DOCUMENTS 1,262,786  4/1918  Harley ................................. 280/288

FOREIGN PATENT DOCUMENTS 0063719  11/1982  European Pat. Off. ........ 280/281 R
367540   7/1939   Italy ................................ 280/281 R
427983   12/1946  Italy ................................ 280/281 R
1895     11/1896  United Kingdom ............ 280/281 R
24,547   00/0000  United Kingdom.

Primary Examiner—John A. Pekar

[57] ABSTRACT

Bicycle frame seat stays provide relatively greater lateral stiffness and relatively less vertical stiffness if they are oval-shaped in cross section and oriented with the major axis horizontal.

4 Claims, 4 Drawing Figures

BICYCLE FRAME SEAT STAYS

FIELD OF THE INVENTION

The present invention relates to the seat stays of a bicycle frame and, in particular, to seat stays that reduce side to side deflection of the main triangle relative to the rear wheel dropouts.

BACKGROUND OF THE INVENTION

A bicycle frame is a form of structural truss, the purposes of which are, first, to support the rider by transmitting his or her weight to the axles of the wheels and, second, to maintain the rear changer at a substantially fixed position relative to the chainrings for efficient transmission of the driving force through the chain.

The frame of a modern bicycle comprises a substantially triangular main section, termed the main triangle and composed of the seat tube, top tube, head tube, and down tube, and a "rear triangle" section composed of the seat tube, a pair of chainstays and a pair of seat stays. This frame geometry is highly efficient in supporting vertical loads but distinctly inefficient in supporting side loads. The vertical loads are transmitted primarily by tension and compression forces in the frame members while the side loads are transmitted by flexural and torsional forces. It is universally recognized that the inherent load-carrying characteristics of a bicycle frame are to a considerable extent somewhat the opposite of what is desirable. It would be preferable to have less stiffness in the vertical direction for improved comfort to the rider afforded by greater absorption in the frame of shock loads coming from the road and greater stiffness in the lateral direction for greater efficiency in the utilization of the energy of the rider and easier steering control and handling.

When a bicycle rider is pedaling even moderately hard, the frame rocks cyclically from side to side in correspondence with the shift of part of the rider's weight from one pedal to the other. This rocking motion creates side loads on the frame that bend the frame back and forth from side to side. With some bicycles the bending can be so great under very hard pedaling that the chain actually comes off the chainring due to loss of proper chain tracking. In any case, part of the rider's energy is transduced into frame deformation. Additional energy and attention are required for steering.

The rear changer and the chainrings are located about two inches off the center line of the frame. This results in torsional and lateral flexural loads in the rear triangle due to lateral deflection of the rear dropouts relative to the bottom bracket shell caused by the bending moment arm through which the chain forces act on the rear triangle. These loads are usually cyclical, and the dynamic effect of the changes during each crank cycle intensifies the loading, as compared to a static load.

The rear triangle is singularly important to the ability of the bicycle to carry as stably as possible a rear rack load. Bicycle tourists routinely transport many tens of pounds of gear on a rear rack. For this they need, first of all, a very stiff rack, lest this heavy "tail" start wagging the "dog" from time to time. Given a good rack, a heavy rack load introduces additional loads into the rear triangle that tend to produce side sway or "fish-tailing". If the rear triangle lacks lateral stiffness, another set of rider fatigue factors, those of greater steering effort and body control to offset the effects of a load that has, so to speak, a mind of its own come into play. In worst case situations, such as high speeds on downhill curves, fish-tailing is downright dangerous.

An object of the present invention is to stiffen the rear triangle in the lateral direction.

A further object of the invention is to maintain high torsional strength in the rear triangle.

It is also an object of the invention to minimize the weight of the rear triangle.

SUMMARY OF THE INVENTION

There is provided, in accordance with the present invention, an improvement in bicycle frame seat stays, which are the two tubular members that extend downwardly, rearwardly and slightly divergantly from the upper portion of the seat tube to the two rear wheel dropouts. The present invention is characterized in that at each cross section along the length of each seat stay the area moment of inertia $I_v$ about the vertical axis is substantially greater than the area of moment of inertia $I_h$ about the horizontal axis. As used above and throughout this document, the terms "vertical axis" and "horizontal axis" shall be understood to refer to mutually perpendicular neutral axes that lie in a plane perpendicular to the longitudinal axis of the respective seat stay. When the bicycle stands upright on a level surface, the horizontal axis referred to in this document is horizontal in the strict sense, but the vertical axis referred to in this document is not truly vertical in the strict sense, inasmuch as the seat stays extend obliquely to the horizontal.

The deflection of a particular point on a structural member subject to a bending moment is inversely proportional to the area moment of inertia of the cross section of the member at the point in question about the neutral axis of the section that is perpendicular to the direction of the bending load (or a directional component of the bending load). Accordingly, the larger area moment of inertia $I_v$ about the vertical axis results in a lesser deflection, i.e., a greater stiffness, of the member due to horizontal bending loads. Conversely, the lesser area moment of inertia $I_h$ about the horizontal axis of the seat stays, according to the present invention, affords greater vertical deflection due to vertical bending loads, i.e., greater vertical flexibility. Hence, for a seat stay having a given cross-sectional area at a given location, and therefore a given tensile and compressive strength, the present invention provides relatively greater flexibility in the vertical direction and relatively less flexibility in the horizontal direction. This is desirable for the reasons described above, namely, the rear triangle is less stiff in the vertical direction for better absorption of shock loads coming from the road and is stiffer in the horizontal direction for reduced side-to-side deflections of the rear triangle due to the cyclical sideloads on the frame during pedalling and the moment produced by the chain tension. The rear triangle is also stiffened horizontally against fish-tailing caused by loads on the rear rack. Experienced cyclists can readily detect the different handling characteristics of bicycle frames having different lateral stiffnesses and recognize a high degree of lateral stiffness as enhancing efficiency, in the sense of requiring less energy to propel the bicycle.

There are various ways of adjusting the relationship between $I_v$ and $I_h$, such as varying the wall thickness of a seat stay of circular cross section or providing ribs internally or externally along either side of the seat stay.

It is presently believed, however, that an entirely satisfactory way of proportioning $I_v$ and $I_h$ for a given cross sectional area is to make the seat stay oval-shaped and of substantially uniform wall thickness at each cross-section. This should be less costly than other structures. It is, moreover, presently believed that each seat stay should be of uniform cross section along its length; there appear to be minimum benefits to be derived from varying the cross section along the length, when weighed against the higher costs of manufacturing more complex members. It is preferred, according to the present invention, that the ratio of $I_v$ to $I_h$, at each cross section along the length of each seat stay be in the range of from about 1.5:1 to 2.75:1.

DESCRIPTION OF THE EXEMPLARY EMBODIMENT

Figure 1:
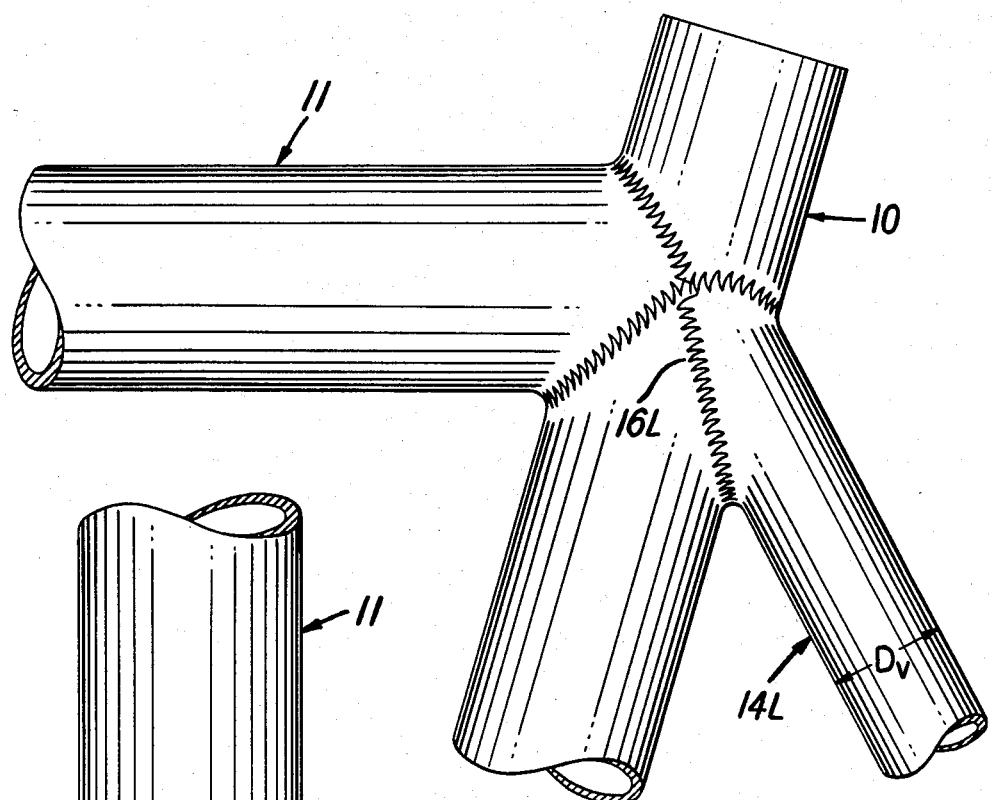
FIG. 1 is a fragmentary side elevational view of the juncture of the seat tube, top tube and seat stays, the seat stays embodying the present invention.
Figure 2:
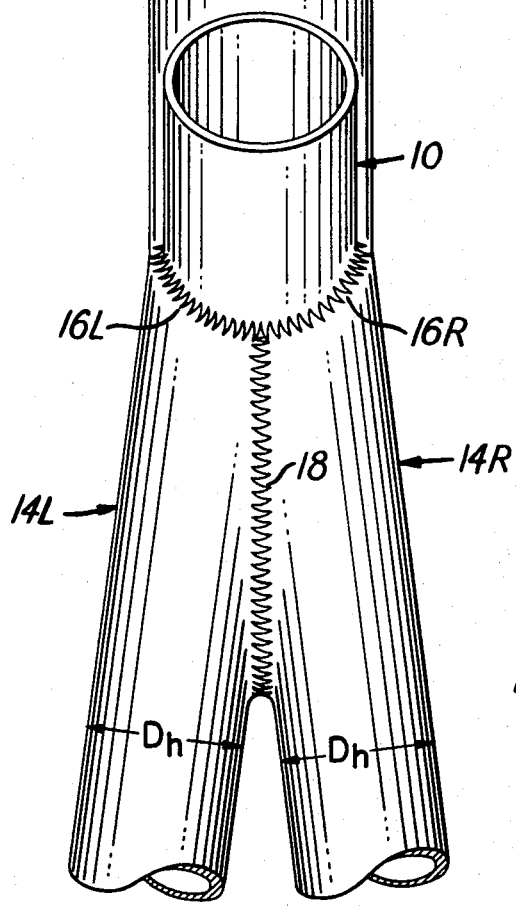
FIG. 2 is a fragmentary view of the juncture shown in FIG. 1 taken orthogonally to the plane defined by the axes of the seat stays.
Figure 3:
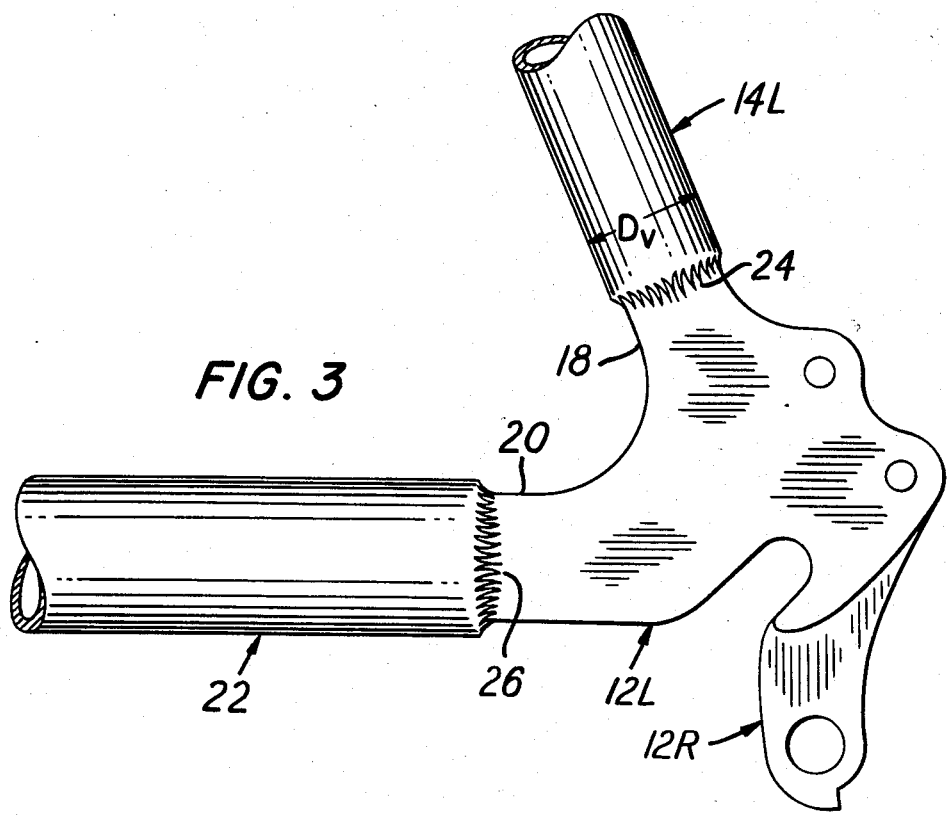
FIG. 3 is a fragmentary left side elevational view of the juncture between the seat stays, the chainstays and rear dropouts.
Figure 4:
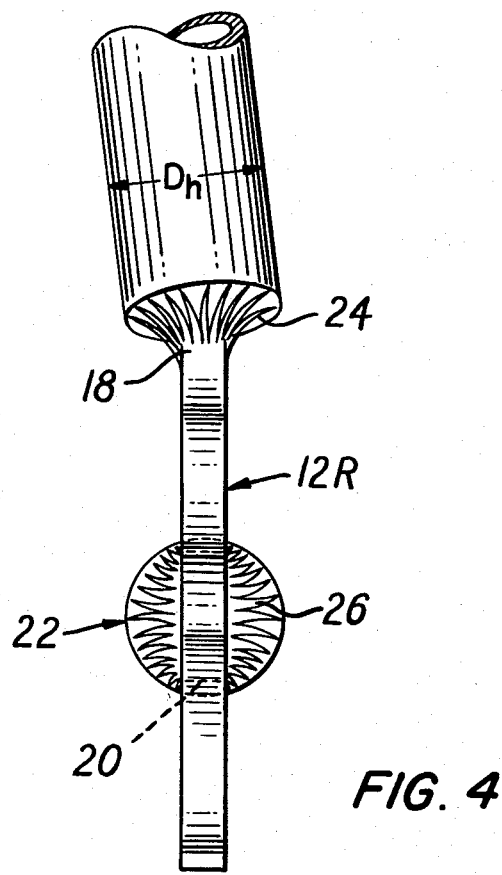
FIG. 4 is a fragmentary rear elevational view of the right part of the juncture shown in FIG. 3.

Seat stays embodying the present invention are used in the same way as in any conventional bicycle frame, namely to join the upper portion of the seat tube 10 at the location of the juncture with the top tube 11 (FIGS. 1 and 2) to the respective rear dropouts 12L (left) and 12R (right) (FIGS. 3 and 4) —FIG. 3 shows the lug of the right dropout on which the rear changer is mounted. There are two seat stays 14R and 14L (right and left) that are joined to the seat tube 10 and to each other at the upper end and extend downwardly, rearwardly and slightly outwardly to the respective rear dropouts 12R and 12L. The upper end of each seat stay is cut away so that the ends fit the seat tube, and portions of the walls abut each other. The junctures 16R and 16L between the seat stays and the seat tube and the juncture 18 between the two seat stays are welded. The meeting and welding of the two seat stays along the juncture 18 provide a strong and rigid connection at the upper juncture of the rear triangle.

Each rear dropout 12L and 12R is a metal plate of uniform thickness and includes a leg portion 18 that is received within the lower end of the respective seat stay and another leg 20 that extends into the chainstay 22. The stays are welded to the dropouts by weldments 24 and 26, the spaces between the stays and the dropouts being filled with weld metal (see FIG. 4).

In the embodiment of the invention shown in the drawings, the seat stays are straight, are of uniform cross section throughout their length (except for the cut away segments at the upper ends) and are of uniform wall thickness throughout their circumference. Each seat stay is elliptical in cross section. In order to make $I_v$ greater than $I_h$, the horizontal dimension $D_h$ of each seat stay is substantially greater than the vertical dimension $D_v$ (all of the figures of the drawings are of the same scale).

SPECIFIC EXAMPLE

A suitable design for the seat stays of an aluminum alloy 6061-T6 bicycle frame is a tube with a uniform wall thickness of 0.038 inch and an elliptical cross-section with a $D_h$ of 1.00 inch and a $D_v$ of 0.75 inch. The ratio of $I_h$ to $I_v$ in this design is 1.58:1.

In another design of the same alloy, the ellipse measures 1.1875 inch by 0.640 inch with a wall thickness 0.040 inch, giving a ratio of $I_v$ to $I_h$ of 2.68:1.

I claim:

1. Seat stays of a bicycle frame, namely tubular members joining the upper portion of the seat tube to the respective rear wheel dropouts, characterized in that at each cross section along the length of each seat stay the area moment of inertia $I_v$ about the vertical axis is substantially greater than the area moment of inertia $I_h$ about the horizontal axis.

2. Seat stays according to claim 1 and further characterized in that each seat stay is oval-shaped and of substantially uniform wall thickness at each cross section along its length.

3. Seat stays according to claim 1 and further characterized in that each seat stay is of uniform cross section along its length.

4. Seat stays according to claim 1 and further characterized in that the ratio of $I_v$ to $I_h$ at each cross section of each seat stay is in the range of from about 1.5:1 to 2.75:1.

* * * * *